US012322879B2

(12) United States Patent
Liu et al.

(10) Patent No.: US 12,322,879 B2
(45) Date of Patent: Jun. 3, 2025

(54) ANTENNA DEVICE

(71) Applicant: MEDIATEK Inc., Hsinchu (TW)

(72) Inventors: Nai-Chen Liu, Hsinchu (TW); Chung-Hsin Chiang, Hsinchu (TW); Yen-Ju Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 186 days.

(21) Appl. No.: 18/352,305

(22) Filed: Jul. 14, 2023

(65) Prior Publication Data

US 2024/0047886 A1 Feb. 8, 2024

Related U.S. Application Data

(60) Provisional application No. 63/370,292, filed on Aug. 3, 2022.

(51) Int. Cl.

| | |
|---|---|
| ***H01Q 9/04*** | (2006.01) |
| ***H01Q 1/48*** | (2006.01) |
| ***H01Q 1/50*** | (2006.01) |
| ***H01Q 1/52*** | (2006.01) |

(52) U.S. Cl.

CPC ............. *H01Q 9/0442* (2013.01); *H01Q 1/48* (2013.01); *H01Q 1/50* (2013.01); *H01Q 1/52* (2013.01)

(58) Field of Classification Search

CPC .......... H01Q 9/0442; H01Q 1/48; H01Q 1/50; H01Q 1/52; H01Q 1/521; H01Q 21/065; H01Q 9/0421

See application file for complete search history.

(56) References Cited

U.S. PATENT DOCUMENTS

| | | | | |
|---|---|---|---|---|
| 6,914,563 B2 * | 7/2005 | Chen | H01Q 13/10 343/700 MS | |
| 8,223,077 B2 * | 7/2012 | Chiang | H01Q 9/0421 343/702 | |
| 10,833,401 B2 * | 11/2020 | Thotahewa | H01Q 1/246 | |
| 11,289,809 B2 * | 3/2022 | Adela | H01Q 9/26 | |
| 2021/0013610 A1 | 1/2021 | Chiang | | |

FOREIGN PATENT DOCUMENTS

WO WO-2021088630 A1 * 5/2021 ............... H01Q 1/38

* cited by examiner

*Primary Examiner* — Seung H Lee

(74) *Attorney, Agent, or Firm* — McClure, Qualey & Rodack, LLP

(57) ABSTRACT

An antenna device with a tunable gain, includes a ground plane and a plurality of resonating units. A first resonating unit of the resonating units includes the following elements. A radiating plate, is arranged above the ground plane, and substantially parallel with the ground plane. A ground wall, is arranged between the radiating plate and the ground plane, and substantially perpendicular to the ground plane. A first connecting element, extends along a predefined direction substantially perpendicular to the ground plane. The first connecting element is adapted to couple the radiating plate to the ground plane.

20 Claims, 14 Drawing Sheets

ANTENNA DEVICE

This application claims the benefit of U.S. provisional application Ser. No. 63/370,292, filed Aug. 3, 2022, the subject matter of which is incorporated herein by reference.

TECHNICAL FIELD

The present disclosure relates to an electronic device, and more particularly, relates to an antenna device with a tunable gain.

BACKGROUND

In the technology of wireless communication, the antenna device acquires a significant role which dominates overall performance of the RF front end of the wireless device. For achieving enhanced transmission rate and improved signal quality, various modulation and diversity schemes have been utilized, such as, carrying data by radio frequency (RF) signals with multi-broadband and/or multi-polarizations. In order to suit these schemes, either mechanical structure or signal path of the antenna device needs to be adapted, such that the antenna device achieves a capability to process RF signals with multi-broadband and/or multi-polarization.

The antenna device serves to provide an antenna gain when transmitting the RF signals. When several wireless devices transmit RF signals concurrently over a multi-broadband spectrum, RF signals from different antenna devices may interfere with one another. In this concern, different values of antenna gain are required for different frequency bands, such that interference at the interested frequency band may be minimized.

In view of the above requirement, it is therefore desirable to have a novel antenna device with a tunable antenna gain, which may be respectively adjusted for different frequency bands.

SUMMARY

According to an aspect of the present disclosure, an antenna device with a tunable gain is provided. The antenna device includes a ground plane and a plurality of resonating units. A first resonating unit of the resonating units includes the following elements. A radiating plate, arranged above the ground plane, and substantially parallel with the ground plane. A ground wall, arranged between the radiating plate and the ground plane, and substantially perpendicular to the ground plane. A first connecting element, extending along a predefined direction substantially perpendicular to the ground plane. The first connecting element is adapted to couple the radiating plate to the ground plane.

According to another aspect of the present disclosure, an antenna device with a tunable gain is provided. The antenna device includes a ground plane and a plurality of resonating units. A first resonating unit of the resonating units includes the following elements. A radiating plate, arranged above the ground plane, and substantially parallel with the ground plane. A ground wall, arranged between the radiating plate and the ground plane, and substantially perpendicular to the ground plane. A first connecting element, extending along a predefined direction substantially perpendicular to the ground plane. A second connecting element, substantially parallel with the first connecting element. The first connecting element and the second connecting element are adapted to couple the radiating plate to the ground plane. The radiating plate extends along a predefined plane, the first connecting element has a first projection on the predefined plane, and the second connecting element has a second projection on the predefined plane, at least one of the first projection and the second projection is located within a plurality of boundaries of the radiating plate.

Figure 1:
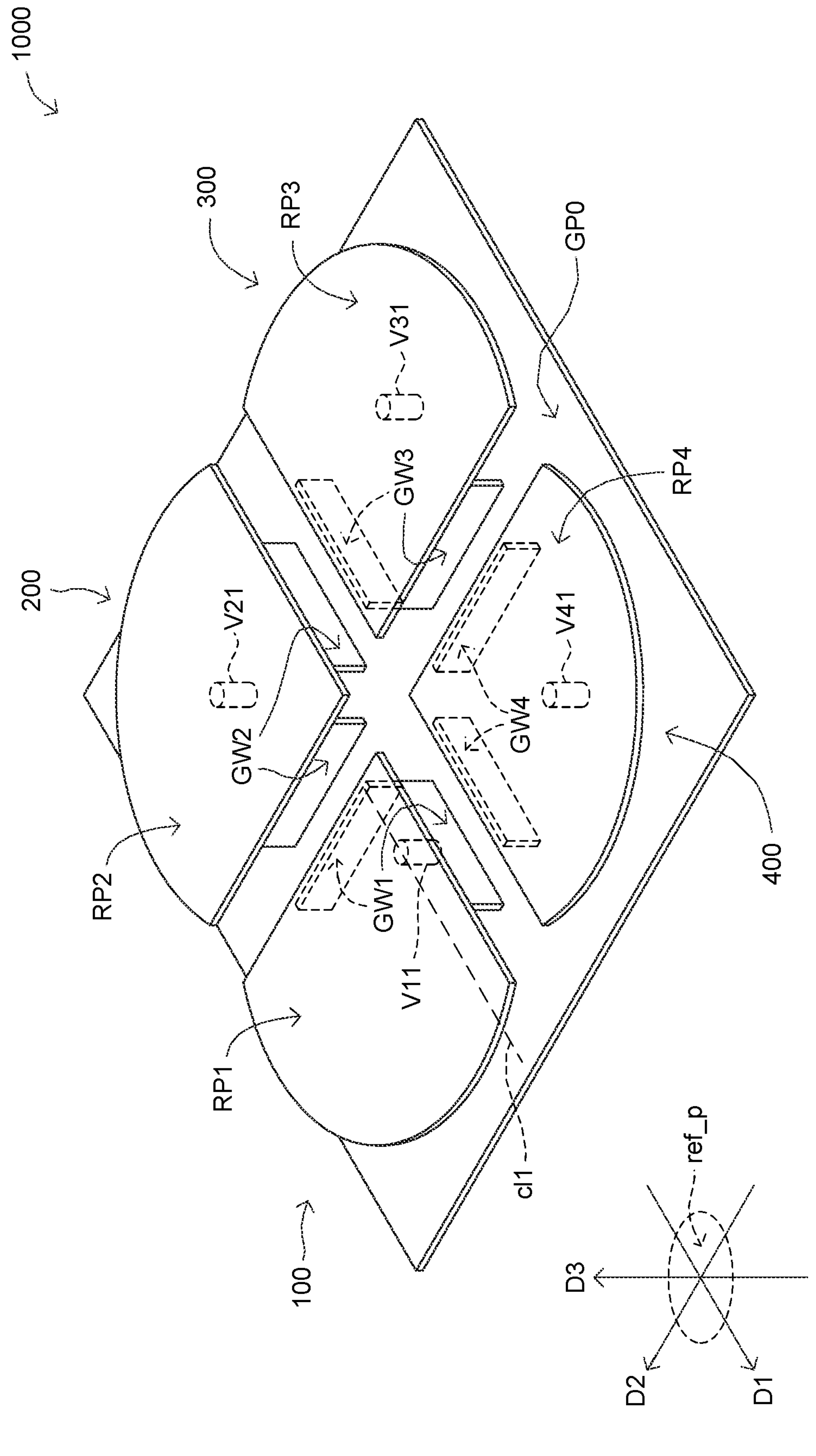
FIG. 1 is a schematic diagram illustrating a perspective view of an antenna according to an example of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

FIG. 1 is a schematic diagram illustrating a perspective view of an antenna 1000 according to an example of the present disclosure. Referring to FIG. 1, the antenna 1000 includes a ground plane GP0 and a plurality of resonating units, for example, four the resonating units 100, 200, 300 and 400. The resonating units 100-400 are arranged above the ground plane GP0. Each of the resonating units 100-400 has a radiating plate and a ground wall. For example, the resonating unit 100 has a radiating plate RP1 and a ground wall GW1. Likewise, the resonating unit 200 has a radiating plate RP2 and a ground wall GW2. Similarly, the resonating unit 300 has a radiating plate RP3 and a ground wall GW3, and the resonating unit 400 has a radiating plate RP4 and a ground wall GW4.

The ground plane GP0 is arranged as extending along a reference plane ref_p which is defined by a direction D1 and a direction D2. Furthermore, each of the radiating plates RP1-RP4 is arranged as being substantially parallel with the ground plane GP0. On the other hand, each of the ground walls GW1-GW4 may have two portions, the ground walls GW1-GW4 are arranged as extending along a direction D3, and the direction D3 is substantially perpendicular to the reference plane ref_p which the ground plane GP0 extends along. That is, the ground walls GW1-GW4 are substantially perpendicular to the ground plane GP0 and the radiating plates RP1-RP4. Moreover, the ground walls GW1-GW4 may connect the ground plane GP0 the radiating plates RP1-RP4 respectively.

In the resonating unit 100, the ground wall GW1 is adapted to connect the radiating plate RP1 with the ground plane GP0. Likewise, in the resonating unit 200, the ground wall GW2 is adapted to connect the radiating plate RP2 with the ground plane GP0. Similarly, the ground wall GW3 of the resonating unit 300 is adapted to connect the radiating plate RP3 with the ground plane GP0, and the ground wall GW4 of the resonating unit 400 is adapted to connect the radiating plate RP4 with the ground plane GP0.

In operation, the antenna 1000 has an antenna gain for the TX signal or the RX signal. In order to make the antenna gain tunable with respect to different frequency bands, the antenna 1000 further includes connecting elements arranged in the resonating units 100-400 respectively. These connecting elements contribute to adjust a corresponding antenna gain at a desired frequency band. For example, the antenna 1000 includes a connecting element, i.e., a via V11 arranged in the resonating unit 100. The via V11 is arranged between the radiating plate RP1 and the ground plane GP0. The via V11 extends substantially along the direction D3, such that the via V11 is substantially perpendicular to the radiating plate RP1 and the ground plane GP0, and substantially parallel with the ground wall GW1.

The via V11 has a conductive material to convey an electrical signal or a magnetic signal, such that the via V11 is adapted to couple the radiating plate RP1 to the ground plane GP0. For example, the via V11 serves to directly connect (e.g., conductively connect) the radiating plate RP1 with the ground plane GP0, or indirectly couple (e.g., electromagnetically couple) the radiating plate RP1 to the ground plane GP0. In one exemplary arrangement, the via V11 directly contacts both the radiating plate RP1 and the ground plane GP0, such that the radiating plate RP1 is directly connected with the ground plane GP0 through the via V11.

In another exemplary arrangement, the via V11 directly contacts one of the radiating plate RP1 and the ground plane GP0, but the via V11 is indirectly coupled to the other one of the radiating plate RP1 and the ground plane GP0. Therefore, the radiating plate RP1 is indirectly coupled to the ground plane GP0 through the via V11. In an alternative arrangement, the via V11 is indirectly coupled to both the radiating plate RP1 and the ground plane GP0, hence the radiating plate RP1 is indirectly coupled to the ground plane GP0 through the via V11.

Similar to the via V11 of the resonating unit 100, other resonating units 200, 300 and 400 also include corresponding vias V21, V31 and V41 respectively. For the resonating unit 200, the via V21 is arranged between the radiating plate RP2 and the ground plane GP0. The via V21 is substantially perpendicular to the radiating plate RP2 and the ground plane GP0, and substantially parallel with the ground wall GW2. Likewise, the via V31 of the resonating unit 300 is arranged between the radiating plate RP3 and the ground plane GP0. The via V31 is substantially perpendicular to the radiating plate RP3 and the ground plane GP0, and substantially parallel with the ground wall GW3. Furthermore, the via V41 of the resonating unit 400 is arranged between the radiating plate RP4 and the ground plane GP0. The via V41 is substantially perpendicular to the radiating plate RP4 and the ground plane GP0, and substantially parallel with the ground wall GW4.

In the example of FIG. 1, each of the resonating units 100-400 include one via. In other examples, each of the resonating units 100-400 may include two or more vias (not shown in FIG. 1). The resonating units 100-400 may include different amounts of vias, such as, the resonating unit 100 includes one via, and the resonating unit 200 includes three vias, etc.

Figure 2A:
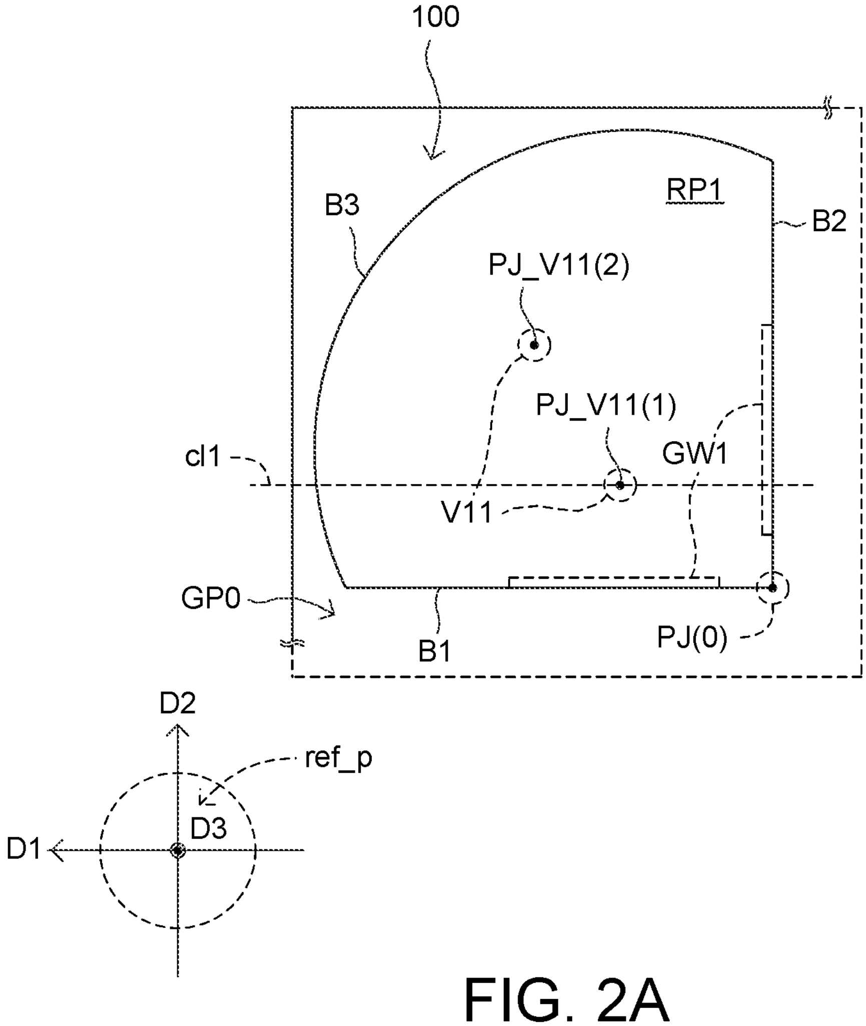
FIG. 2A is a schematic diagram illustrating a top view of one resonating unit of FIG. 1.

FIG. 2A is a schematic diagram illustrating a top view of the resonating unit 100 of FIG. 1, and the resonating unit 100 in FIG. 2A is viewed along the direction D3. Referring to FIG. 2A, the radiating plate RP1 extends along another predefined reference plane (not shown) which is parallel with the reference plane ref_p of the ground plane GP0, and there are boundaries B1, B2 and B3 surrounding the radiating plate RP1. The via V11 of the resonating unit 100 has a projection PJ_V11(1). The projection PJ_V11(1) is taken along the direction D3 and projected on the radiating plate RP1. The projection PJ_V11(1) is located within the boundaries B1-B3.

Furthermore, two portions of the ground wall GW1 also have projections taken along the direction D3 and projected on the radiating plate RP1. The projections of two portions of the ground wall GW1 may extend to intersect at a projection position PJ(0), and the projection position PJ(0) may be located around an intersection of the boundaries B1 and B2. In a comparative example (other than the examples of the present disclosure), a via is arranged at the projection position PJ(0) to serve as a part of the ground wall GW1. However, the via V11 of the present disclosure may not serve as any part of the ground wall GW1, therefore, the projection PJ_V11(1) of the via V11 may not be located at the projection position PJ(0).

In addition, the antenna 100 may adjust its antenna gain by changing the location of the via V11. For example, when the via V11 is changed to another location with a projection PJ_V11(2) (which is projected on the radiating plate RP1, and does not overlap projection PJ_V11(1)), the antenna 1000 may achieve a different value of antenna gain at a desired frequency band.

Figure 2B:
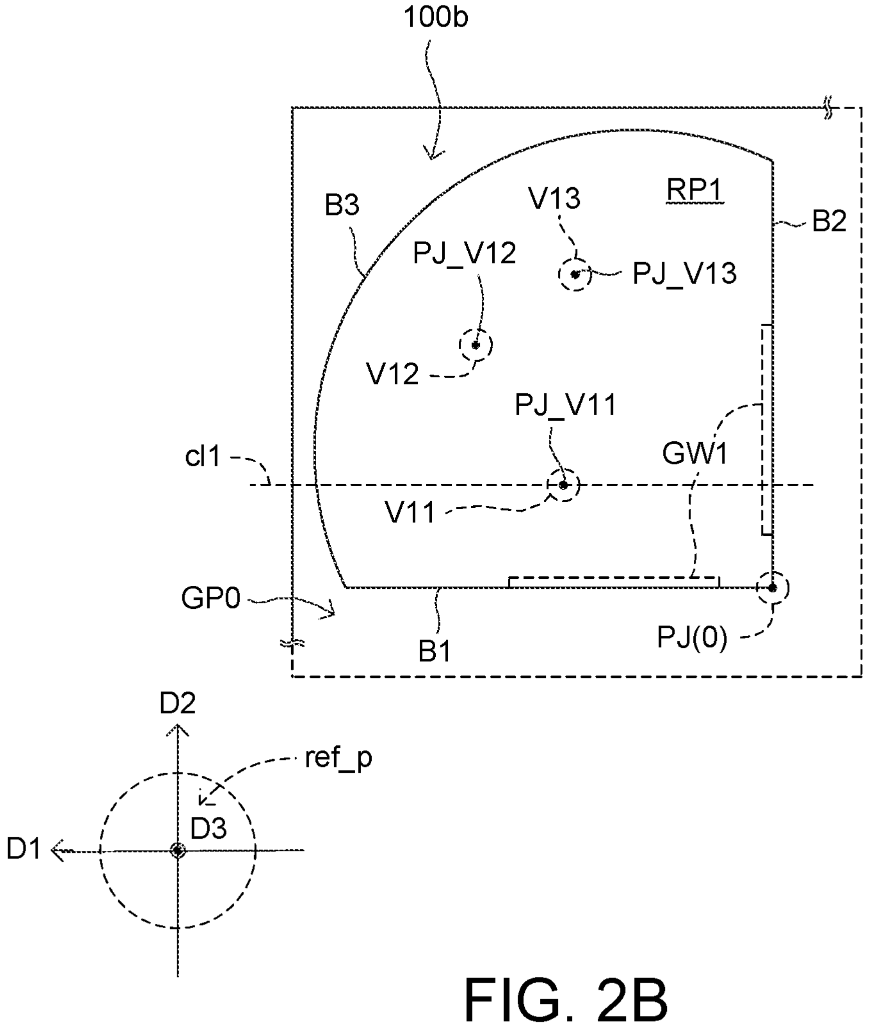
FIG. 2B illustrates a top view of another exemplary resonating unit with respect to FIG. 2A.

FIG. 2B illustrates a top view of another exemplary resonating unit 100*b* with respect to FIG. 2A. The resonating unit 100*b* of FIG. 2B is similar to the resonating unit 100 of FIG. 2A except that, resonating unit 100*b* of FIG. 2B further includes two vias V12 and V13. The via V12 has a projection PJ_V12 on the radiating plate RP1, while the via V13 has a projection PJ_V13 on the radiating plate RP1. The projections PJ_V12 and PJ_V13 may not overlap the projection PJ_V11 of the via V11. Furthermore, the projections PJ_V11 to PJ_V13 of the vias V11-V13 may not overlap the projecting position PJ(0) at which the two portions of the ground wall GW1 intersect. Moreover, at least one of the vias V11-V13 are arranged under the radiating plate RP1, such that, at least one of the projections PJ_V11 to PJ_V13 of the vias V11-V13 are located within the boundaries B1-B3 of the radiating plate RP1.

Since the resonating unit 100*b* of FIG. 2B has a different amount of vias (i.e., three) compared to the amount of via (i.e., one) of the resonating unit 100 of FIG. 2A, the antenna 1000 of FIG. 2B may achieve an antenna gain different from that of FIG. 2A.

FIGS. 3A-3J are schematic diagrams illustrating cross-sectional views of the resonating units 100-1*a* to 100-1*j* according to various examples of the present disclosure. The cross-sectional views in FIGS. 3A-3J are taken along the cutting line cl1 in FIGS. 1, 2A and 2B and viewed from the direction D2. First, referring to FIG. 3A, the resonating unit 100-1*a* includes one connecting element, the via V11 (which may be referred to as "the first connecting element"). The via V11 is arranged between the radiating plate RP1 and the ground plane GP0.

Figure 3A:
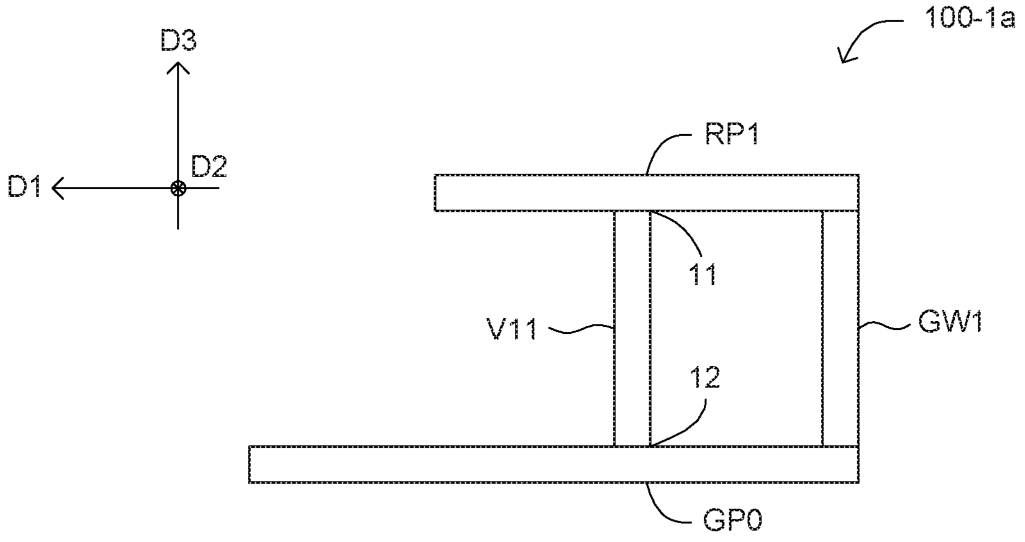
FIGS. 3A-3J are schematic diagrams illustrating cross-sectional views of the resonating units according to various examples of the present disclosure.

The via V11 substantially extends along the direction D3, such that the via V11 is substantially perpendicular to the radiating plate RP1 and the ground plane GP0, and substantially parallel with the ground wall GW1. The via V11 may directly contact one or both of the radiating plate RP1 and the ground plane GP0. Alternatively, the via V11 may be electromagnetically coupled to one or both of the radiating plate RP1 and the ground plane GP0. In the example of FIG. 3A, via V11 directly contacts both of the radiating plate RP1 and the ground plane GP0.

More particularly, via V11 has one end 11 and another end 12. The end 11 of the via V11 directly contacts a lower surface of the radiating plate RP1, and the end 12 of the via V11 directly contacts an upper surface of the ground plane GP0. In this arrangement, the via V11 is conductively connected with both the radiating plate RP1 and the ground plane GP0, such that the via V11 serves to conductively connect the radiating plate RP1 with the ground plane GP0.

Figure 3B:
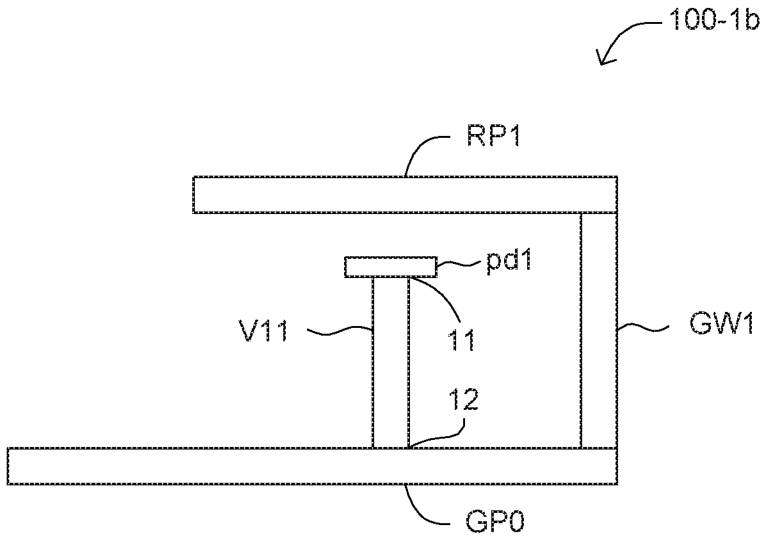

Next, referring to FIG. 3B, the resonating unit 100-1*b* is similar to the resonating unit 100-1*a* of FIG. 3A except that, the via V11 of resonating unit 100-1*b* directly contacts the ground plane GP0 but may not directly contact the radiating plate RP1.

For example, the end 11 of the via V11 may not directly contact the radiating plate RP1. Instead, the end 11 of the via V11 is connected with a pad pd1, and the pad pd1 is isolated from the radiating plate RP1. The pad pd1 has a conductive material, such that an electrical signal or a magnetic signal may be transmitted through the pad pd1. Therefore, the via V11 may be electromagnetically coupled to the radiating plate RP1 through the pad pd1. In this arrangement, the via V11 serves to electromagnetically couple the ground plane GP0 to the radiating plate RP1.

Figure 3C:
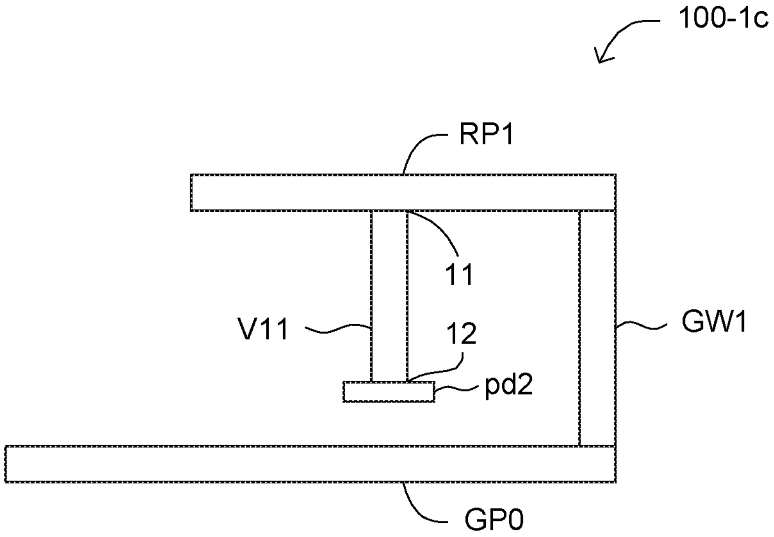

Next, referring to FIG. 3C, the resonating unit 100-1*c* is similar to the resonating unit 100-1*a* of FIG. 3A except that, the via V11 of resonating unit 100-1*b* directly contacts the radiating plate RP1 but may not directly contact the ground plane GP0.

For example, the end 12 of the via V11 may not directly contact the ground plane GP0. Instead, the end 12 of the via V11 is connected with a pad pd2, and the pad pd2 is isolated from the ground plane GP0. The pad pd2 is similar to the pad pd1, and pad pd2 may serves to convey an electrical signal or a magnetic signal. Therefore, the via V11 may be electromagnetically coupled to the ground plane GP0 through the pad pd2.

Figure 3D:
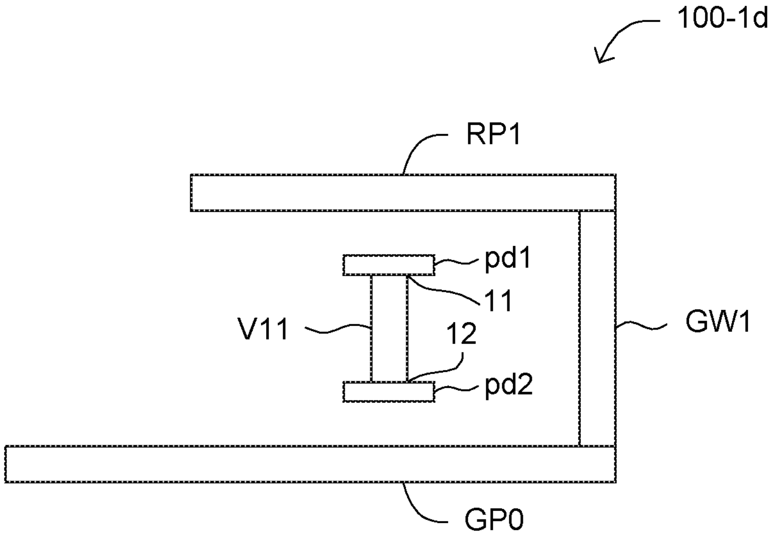

Next, referring to FIG. 3D, the resonating unit 100-1*d* is similar to the resonating unit 100-1*c* of FIG. 3C except that, the via V11 of resonating unit 100-1*b* is electromagnetically coupled to both the radiating plate RP1 and the ground plane GP0. For example, the end 11 of the via V11 is connected with a pad pd1, which is isolated from the radiating plate RP1. In this arrangement, the via V11 may be electromagnetically coupled to the radiating plate RP1 through the pad pd1 and electromagnetically coupled to the ground plane GP0 through the pad pd2.

Figure 3E:
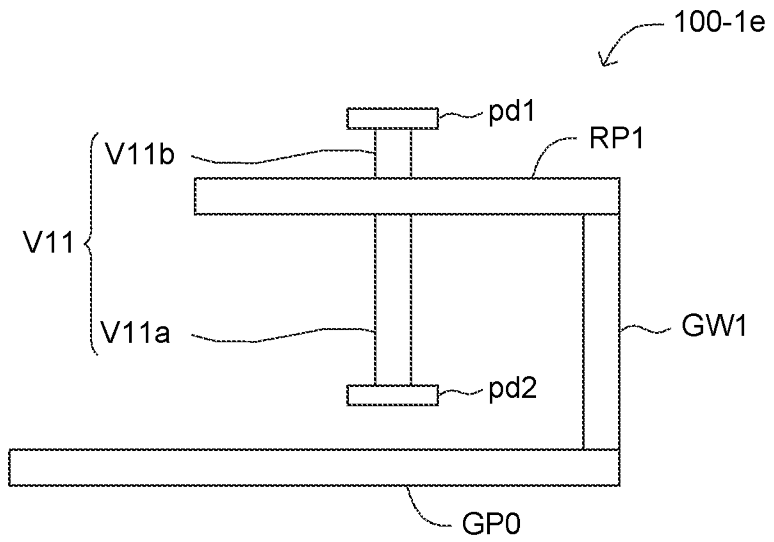

Next, referring to FIG. 3E, the resonating unit 100-1*e* is similar to the resonating unit 100-1*c* of FIG. 3C except that, the via V11 of the resonating unit 100-1*e* has a portion protruding from the upper surface of the radiating plate RP1. More particularly, the via V11 includes one portion V11*a* and another portion V11*b*. The portion V11*a* is arranged between the radiating plate RP1 and the ground plane GP0, and the portion V11*b* is arranged above the portion V11*a*. Furthermore, the portion V11*b* is arranged above the radiating plate RP1, such that the portion V11*b* may protrude from the upper surface of the radiating plate RP1.

One end of the portion V11*a* is connected with a pad pd2, and another end of the portion V11*a* directly contacts the lower surface of the radiating plate RP1. On the other hand, one end of the portion V11*b* is connected with a pad pd1, and another end of the portion V11*b* directly contacts the upper surface of the radiating plate RP1.

Figure 3F:
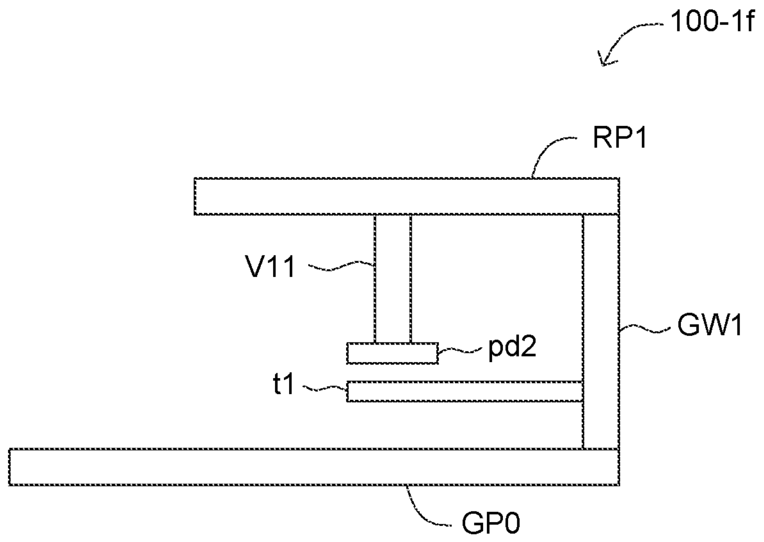

Next, referring to FIG. 3F, the resonating unit 100-1*f* is similar to the resonating unit 100-1*c* of FIG. 3C except that, the resonating unit 100-1*f* of FIG. 3F further includes a trace t1. The trace t1 has a conductive material, which may convey an electrical signal or a magnetic signal. The trace t1 is arranged as being substantially parallel with the radiating plate RP1 and the ground plane GP0, and substantially perpendicular to the via V11 and the ground wall GW1.

One end of the trace t1 directly contacts the ground wall GW1. Another end of the trace t1 is arranged under the pad pd2 and isolated from the pad pd2, such that the trace t1 may be electromagnetically coupled to the pad pd2, and then coupled to the via V11. In this arrangement, the via V11 is electromagnetically coupled to the ground wall GW1 through pad pd2 and the trace t1.

Figure 3G:
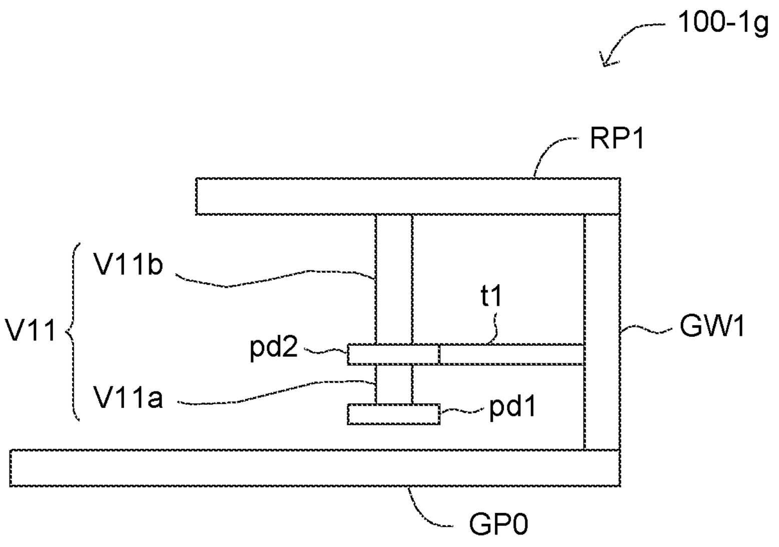

Next, referring to FIG. 3G, the resonating unit 100-1*g* is similar to the resonating unit 100-1*f* of FIG. 3F except that, the pad pd2 of the resonating unit 100-1*g* directly contacts the trace t1. Furthermore, the via V11 directly contacts the pad pd2. More particularly, the via V11 has two portions. One portion V11*b* of via V11 is arranged between the radiating plate RP1 and the pad pd2, while another portion V11*a* of via V11 is arranged between the pad pd2 and another pad pd1. The via V11 may be electromagnetically coupled to the ground plane GP0 through the pad pd1. In this arrangement, the via V11 serves to conductively connect the radiating plate RP1 with the ground wall GW1, and serves to electromagnetically couple the radiating plate RP1 to the ground plane GP0.

Figure 3H:
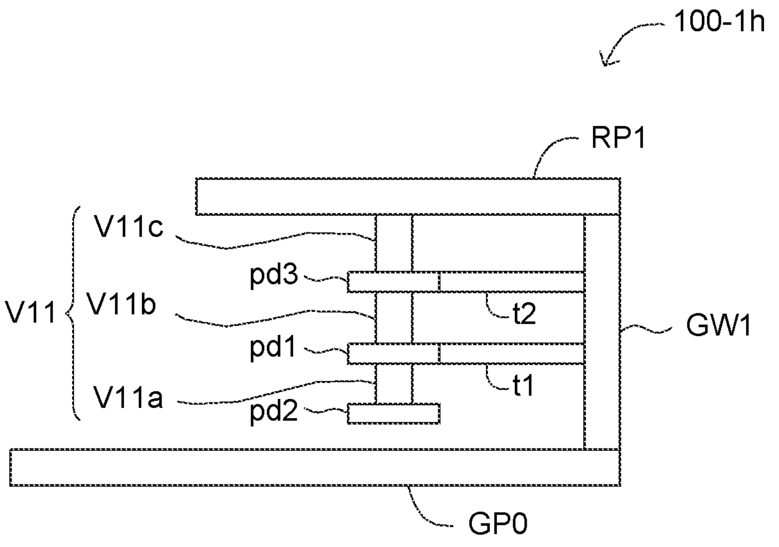

Next, referring to FIG. 3H, the resonating unit 100-1*h* is similar to the resonating unit 100-1*g* of FIG. 3G except that, the resonating unit 100-1*h* further includes another pad pd3 and another trace t2. The pad pd3 directly contacts the trace t2. The V11 is coupled to the ground wall GW1 through the trace t2.

The via V11 of resonating unit 100-1*h* has three portions V11*a*, V11*b* and V11*c*. The portion V11*b* is arranged above the portion V11*a*, and the portion V11*c* is arranged above the portion V11*b*. Furthermore, the portion Vila is arranged between the pads pd2 and pad1, the portion V11*b* is arranged between the pads pd1 and pd3, and the portion V11*c* is arranged between the pad pd3 and the lower surface of the radiating plate RP1. The via V11 may be conductively connected with the ground wall GW1 through a conductive path formed by the pad pd1 and the trace t1, and through another conductive path formed by the pad pd3 and the trace t2.

Figure 3I:
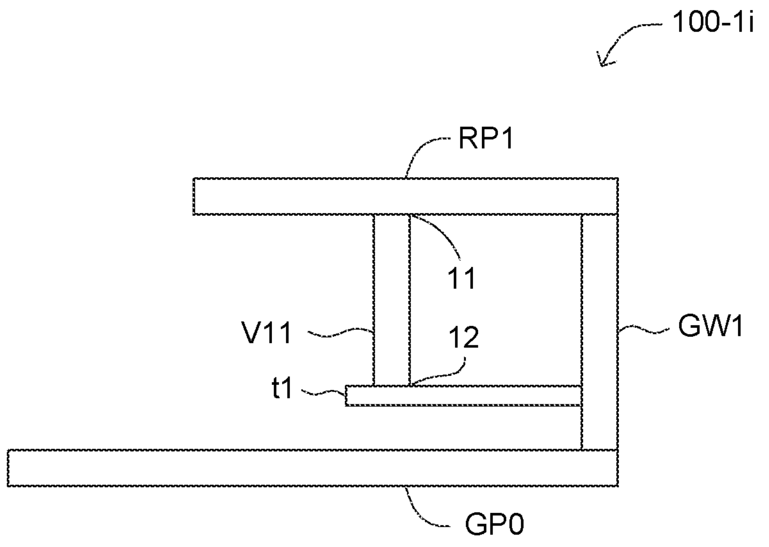

Next, referring to FIG. 3I, the resonating unit 100-1*i* is similar to the resonating unit 100-1*f* of FIG. 3F except that, the via V11 of the resonating unit 100-1*i* is directly connected with the trace t1, without connecting with the pad pd2. The via V11 may be conductively connected with the ground wall GW1 through the trace t1.

Figure 3J:
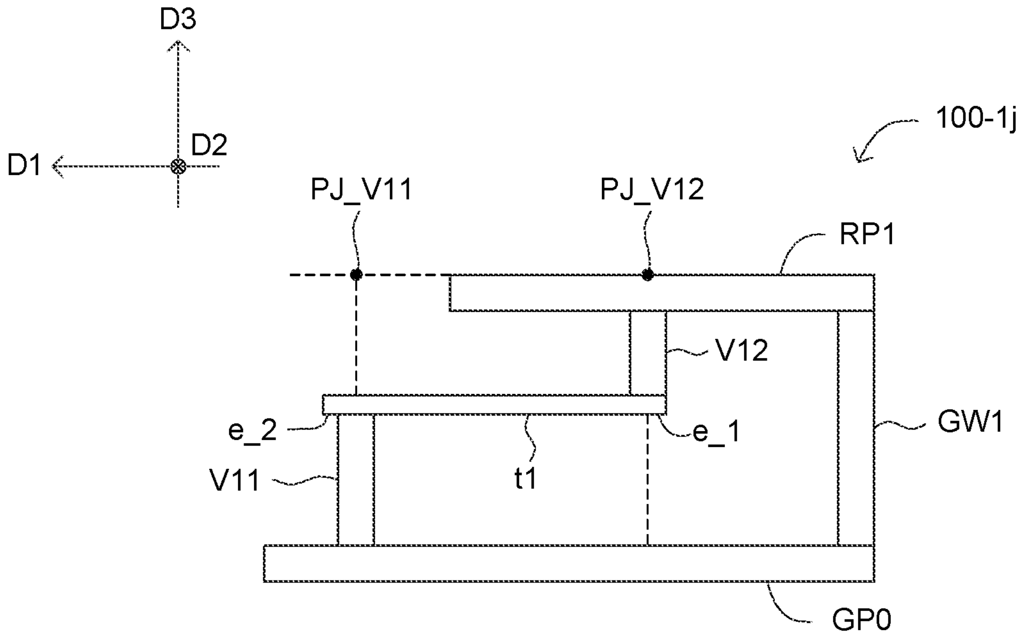

Next, referring to FIG. 3J, the resonating unit 100-1*j* includes two vias V11 and V12. The via V11 may be referred to as "the first connecting element", and the via V12 may be referred to as "the second connecting element". The via V11 is connected with the via V12 through the trace t1. The trace t1 has one end e_1 connected with the via V12 and another end e_2 connected with the via V11. The via V11 is arranged between the end e_2 of the trace t1 and the upper surface of the ground plane GP0, while the via V12 is arranged between the end e_1 of the trace t1 and the lower surface of the radiating plate RP1. In this arrangement, the radiating plate RP1 may be conductively connected with the ground plane GP0 through the via V12, the trace t1 and the via V11.

The via V11 is substantially parallel with the via V12, but the via V11 may not be aligned with the via V12 at the same vertical line along the direction D3. More particularly, the via V11 has a projection PJ_V11. The projection PJ_V11 is taken along the direction D3 and projected on the predefined reference plane which the radiating plate RP1 extends along. Furthermore, the via V12 has a projection PJ_V12, which is taken along the direction D3 and projected on the radiating plate RP1. The projection PJ_V11 of the via V11 may not overlap the projection PJ_V12 of the via V12. In the example of FIG. 3J, projection PJ_V12 of the via V12 is located within the boundaries B1, B2 and B3 of the radiating plate RP1 (the boundaries B1, B2 and B3 of the radiating plate RP1 are shown in FIGS. 2A and 2B). In contrast, the projection PJ_V11 of the via V11 may be located outside the boundaries B1, B2 and B3 of the radiating plate RP1.

Figure 4A:
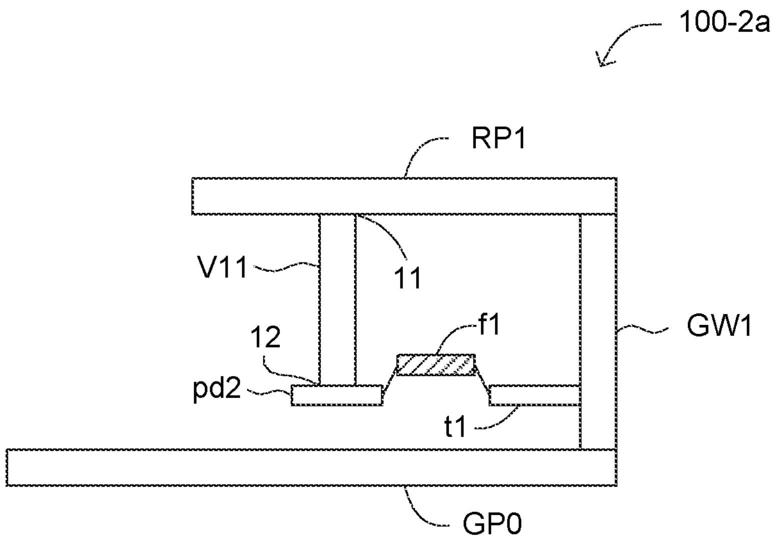
FIGS. 4A and 4B are schematic diagrams illustrating cross-sectional views of the resonating units according to other examples of the present disclosure.
Figure 4B:
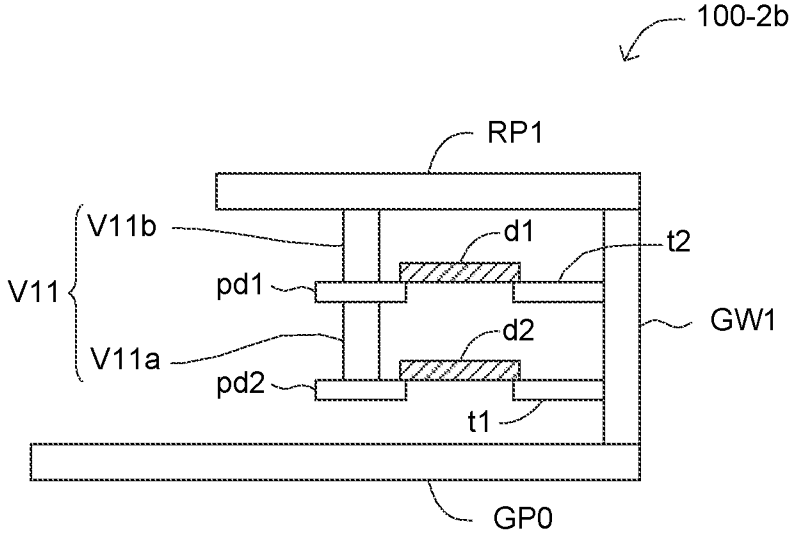

FIGS. 4A and 4B are schematic diagrams illustrating cross-sectional views of the resonating units 100-2*a* and 100-2*b* according to other examples of the present disclosure. First, referring to FIG. 4A, the resonating unit 100-2*a* is similar to the resonating unit 100-1*c* of FIG. 3C except that, the resonating unit 100-2*a* further includes a trace t1 and a control element. The via V11 is coupled to the trace t1 through the control element. The control element is e.g., a filter f1. The filter f1 is arranged between the pad pd2 and the trace t1, such that the filter f1 may conductively connect the via V11 with the ground wall GW1 through the pad pd2 and the trace t1.

In operation, the filter f1 serves to selectively transmit signals of interest at a desired frequency band, and the filter f1 bypass unwanted signals at other frequency band. Therefore, antenna gain of the antenna 1000 may be adjusted for different frequency bands respectively.

In other examples, the control element of the resonating unit 100-2*a* may be a diode, a switch or an impedance tuner (not shown in FIG. 4A).

Next, referring to FIG. 4B, the resonating unit 100-2*b* is similar to the resonating unit 100-2*a* of FIG. 4A except that, the resonating unit 100-2*b* includes two control elements, i.e., two diodes d1 and d2. Furthermore, the resonating unit 100-2*b* further includes another trace t2 and another pad pd1. The diode d2, which replaces the filter f1 of FIG. 4A, is connected with pad pd2 and the trace t1. On the other hand, the pad pd1 is arranged between two portions V11*a* and V11*b* of via V11, and another diode d1 is connected with pad pd1 and the trace t2.

The via 11 is selectively connected with the ground wall GW1 through the pad pd1, the diode d1 and the trace t2, according to a status of the diode d1. When the diode d1 operates at a forward bias, the conductive path between the pad pd1 and the trace t2 is turned on (i.e., short circuit), such that the via V11 may be conductively connected with the ground wall GW1. Furthermore, the via 11 may be also conductively connected with the ground wall GW1 through the pad pd2, the diode d2 and the trace t1, when the diode d2 operates at a forward bias. On the other hand, the via V11 is still electromagnetically coupled to the ground plane GP0 through the pad pd2. In this arrangement, antenna gain of the antenna 1000 may be adjusted according to the status of the diodes d1 and d2.

In other examples, each of the two control elements of the resonating unit 100-2*b* may be a filter, a switch or an impedance tuner (not shown in FIG. 4B).

FIGS. 5A-5H are schematic diagrams illustrating cross-sectional views of the resonating units 100-3*a* to 100-3*h* according to still other examples of the present disclosure. First, referring to FIG. 5A, the resonating unit 100-3*a* is similar to the resonating unit 100-2*a* of FIG. 4A except that, the control element of the resonating unit 100-3*a* is a switch s1, which replaces the filter f1 of the resonating unit 100-2*a*. Furthermore, the resonating unit 100-3*a* further includes another via V12 (i.e., the second connecting element). The via V12 serves to conductively connect the radiating plate RP1 with the ground wall GW1 through the trace t1. In addition, the via V11 is connected with the pad pd1, and the via V12 is connected with a pad pd2, and the switch s1 is connected with the pad pd1 and the pad pd2. Then, the via V11 is coupled to the via V12 through the switch s1.

Figure 5A:
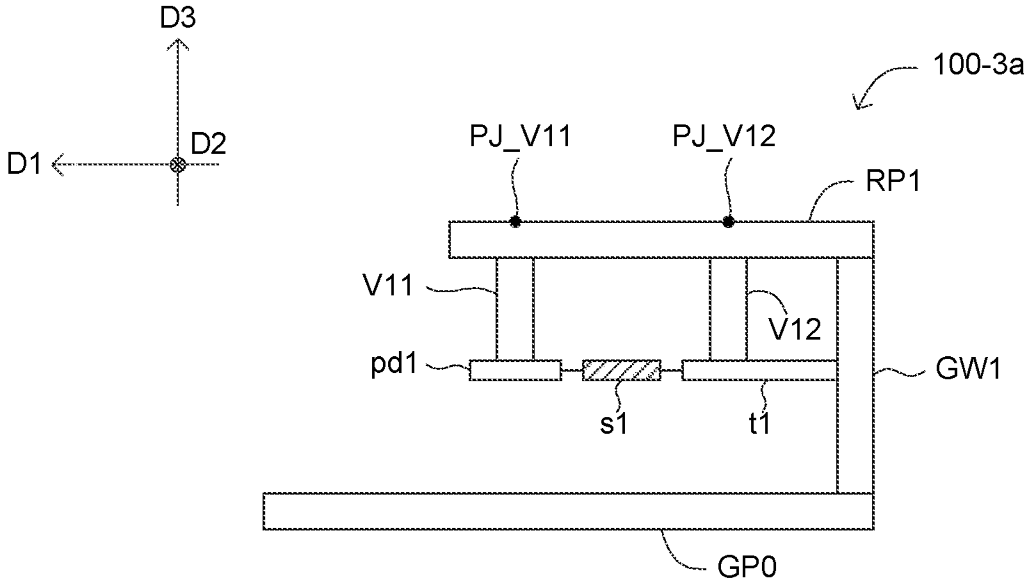
FIGS. 5A-5H are schematic diagrams illustrating cross-sectional views of the resonating units according to still other examples of the present disclosure.

Both the vias V11 and V12 are arranged under the radiating plate RP1. The via V12 is arranged as being substantially parallel with the via V11, and the via V12 may not be aligned with the via V11 at the same vertical line along the third direction D3. The projection PJ_V11 of the via V11, which is projected on the radiating plate RP1, may not overlap the projection PJ_V12 of the via V12. In the example of FIG. 5A, both the projection PJ_V11 of the via V11 and the projection PJ_V12 of the via V12 are located within the boundaries B1, B2 and B3 of the radiating plate RP1 (the boundaries B1, B2 and B3 of the radiating plate RP1 are shown in FIGS. 2A and 2B).

In operation, the switch s1 serves to selectively connect the via V11 with the via V12, depending on the status of the switch s1. When the switch s1 is turned on (i.e., short circuit), the via V11 may be connected with the via V12, and further connected with the ground wall GW1 through the trace t1.

In another example, the resonating unit 100-3*a* may include another via V13 (not shown in FIG. 5A), and the switch s1 may selectively connect the via V11 with the via V13. That is, the resonating unit 100-3*a* includes two conductive paths, the first path is formed by via V11, switch s1 and via V12, while the second path is formed by via V11, switch s1 and via V13. The switch s1 functions to conduct one of the first path and the second path.

Figure 5B:
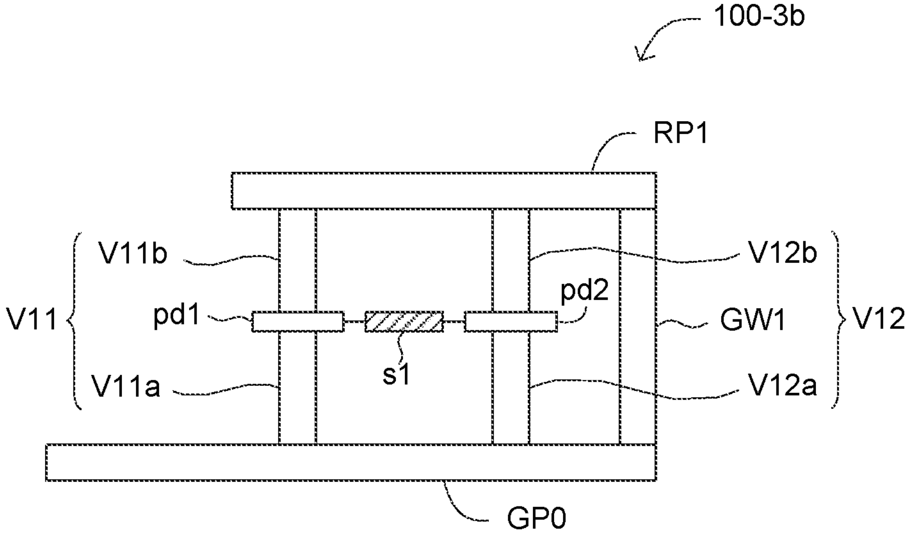

Next, referring to FIG. 5B, the resonating unit 100-3*b* is similar to the resonating unit 100-3*a* of FIG. 5A except that, each of the vias V11 and V12 has two portions. The via V11 has one portion V11*a* and another portion V11*b*. The portion V11*a* is arranged between the pad pd1 and ground plane GP0, and the portion V11*b* is arranged above the portion V11*a*, the portions V11*b* and Vila are coupled to each other through the pad pd1. Likewise, the via V12 has one portion V12*a* and another portion V12*b*. The portion V12*a* is arranged between the pad pd2 and ground plane GP0, and the portion V12*b* is arranged above the portion V12*a*, the portions V12*b* and V12*a* are coupled to each other through the pad pd2. The radiating plate RP1 is conductively connected with the ground plane GP0 through the portions V11*a* and V11*b* and pad pd1. Likewise, the radiating plate RP1 is also conductively connected with the ground plane GP0 through the portions V12*a* and V12*b* and pad pd2.

Unlike the via V12 of FIG. 5A which is coupled to the ground wall GW1 through the trace t1, the via V12 of FIG. 5B may not be coupled to the ground wall GW1 (i.e., the resonating unit 100-3*b* of FIG. 5B may not include the trace t1 as the resonating unit 100-3*a* of FIG. 5A).

Figure 5C:
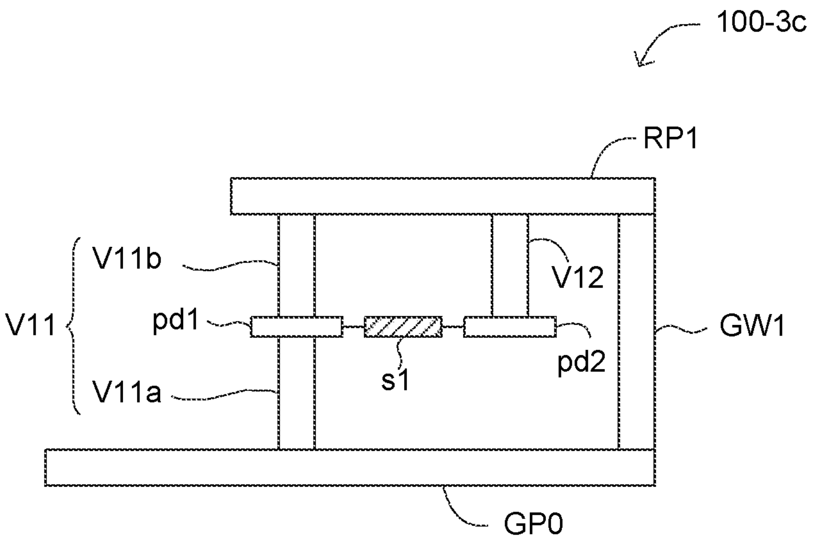

Next, referring to FIG. 5C, the resonating unit 100-3*c* is similar to the resonating unit 100-3*b* of FIG. 5B except that, the via V12 of the resonating unit 100-3*c* has one portion, and the via V12 may not directly contact the ground plane GP0. Instead, the via V12 is electromagnetically coupled to the ground plane GP0 through the pad pd2.

Figure 5D:
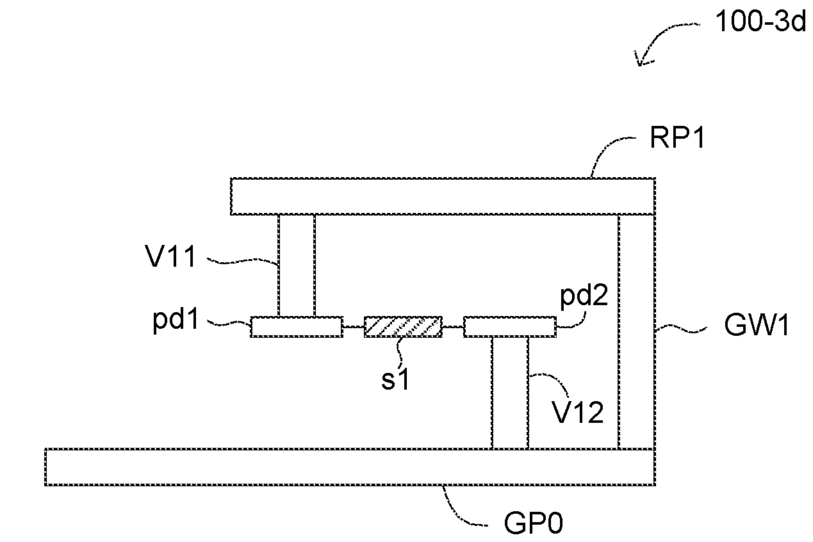

Next, referring to FIG. 5D, the resonating unit 100-3*d* is similar to the resonating unit 100-3*b* of FIG. 5B except that, each of the vias V11 and V12 of the resonating unit 100-3*d* has one portion. The via V11 may not directly contact the ground plane GP0, and instead, the via V11 is electromagnetically coupled to the ground plane GP0 through the pad pd1. Likewise, the via V12 may not directly contact the radiating plate RP1, but is electromagnetically coupled to the radiating plate RP1 through the pad pd2.

Figure 5E:
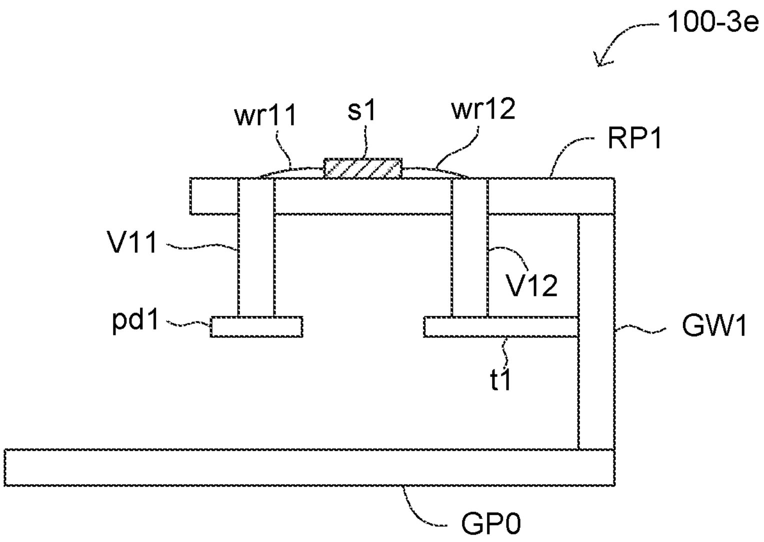

Next, referring to FIG. 5E, the resonating unit 100-3*e* is similar to the resonating unit 100-3*a* of FIG. 5A except that, the switch s1 of the resonating unit 100-3*e* is arranged on the upper surface of the radiating plate RP1. In one example, the vias V11 and V12 may penetrate the radiating plate RP1, such that the switch s1 may be connected with the vias V11 and V12 through wires wr11 and wr12 respectively. In another example (not shown in FIG. 5E), the vias V11 and V12 may not penetrate the radiating plate RP1, instead, the wires wr11 and wr12 may penetrate the radiating plate RP1 to arrive the vias V11 and V12 respectively.

In other examples of FIGS. 5A-5F, the control element of the resonating unit 100-3*a* to 100-3*e* may be a diode, a filter or an impedance tuner (not shown in FIGS. 5A-5F).

Figure 5F:
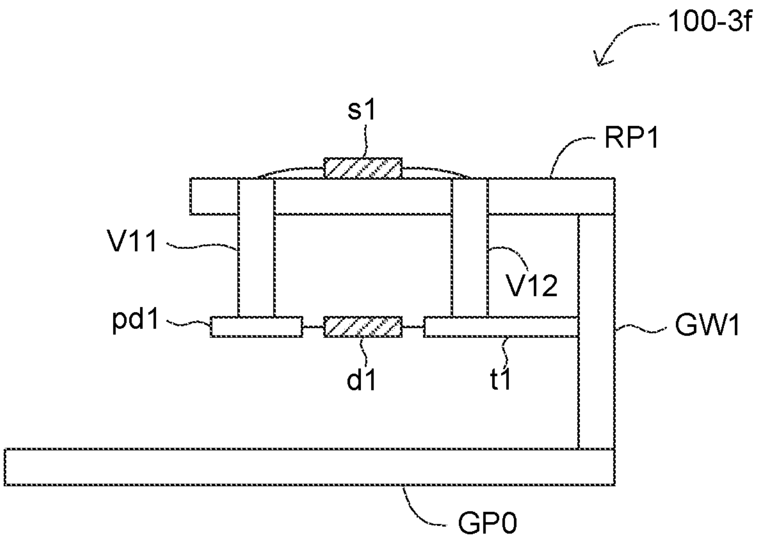

Next, referring to FIG. 5F, the resonating unit 100-3*f* is similar to the resonating unit 100-3*e* of FIG. 5E except that, the resonating unit 100-3*f* includes two control elements, i.e., the switch s1 and the diode d1. The switch s1 may be referred to as "the first control element", and the diode d1 may be referred to as "the second control element". The diode d1 is adapted to couple the via V11 to the via V12. The diode d1 connects the pad pd1 with the trace t1, therefore, the diode d1 is also adapted to couple the first connecting element V11 to the ground wall GW1 through the trace t1.

In other examples, the first control element of the resonating unit 100-3*f* may be a diode, a filter or an impedance tuner. Furthermore, the second control element of the resonating unit 100-3*f* may be a switch, a filter or an impedance tuner (not shown in FIG. 5F).

Figure 5G:
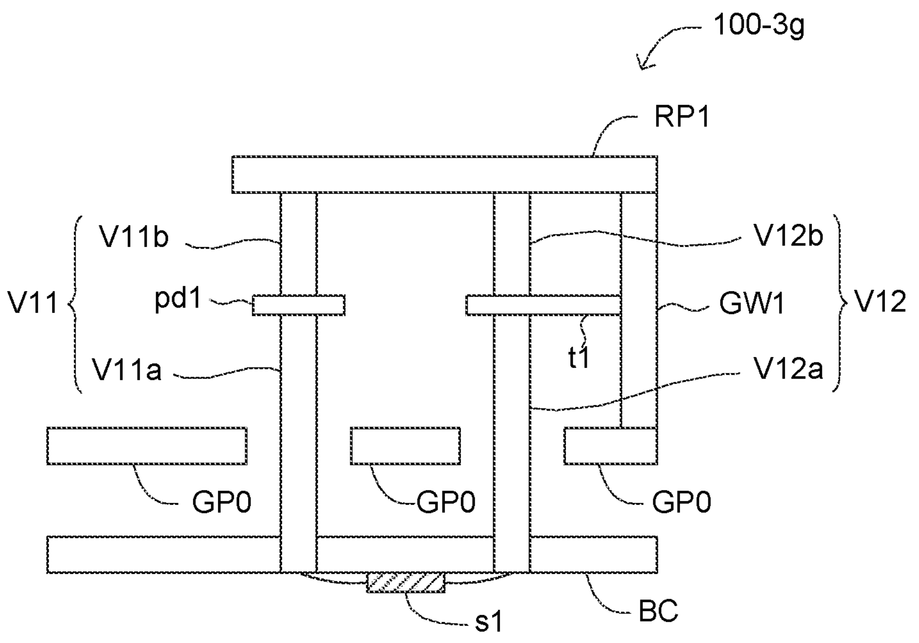

Next, referring to FIG. 5G, the resonating unit 100-3*g* is similar to the resonating unit 100-3*b* of FIG. 5B except that, the via V11 of the resonating unit 100-3*g* is connected with the via V12 through a switch s1 arranged on a bottom circuit board BC of the antenna 1000. The bottom circuit board BC is, e.g., a circuit board carrying peripheral components of the antenna 1000. In one example, the bottom circuit board BC is arranged under the ground plane GP0, and the switch s1 may be arranged on a lower surface of the bottom circuit board BC. The ground plane GP0 may have through holes to allow the vias V11 and V12 to penetrate. Therefore, the vias V11 and V12 may pass through the ground plane GP0 to arrive and coupled to the bottom circuit board BC, and then to connect with the switch s1. Furthermore, the via V12 is connected with the ground wall GW1 through the trace t1.

The via V11 has two portions V11*a* and V11*b*. The portion V11*a* may be electromagnetically coupled to the ground plane GP0 around one through hole of the ground plane GP0. Likewise, one portion V12*a* may be electromagnetically coupled to the ground plane GP0 around another through hole of the ground plane GP0.

Figure 5H:
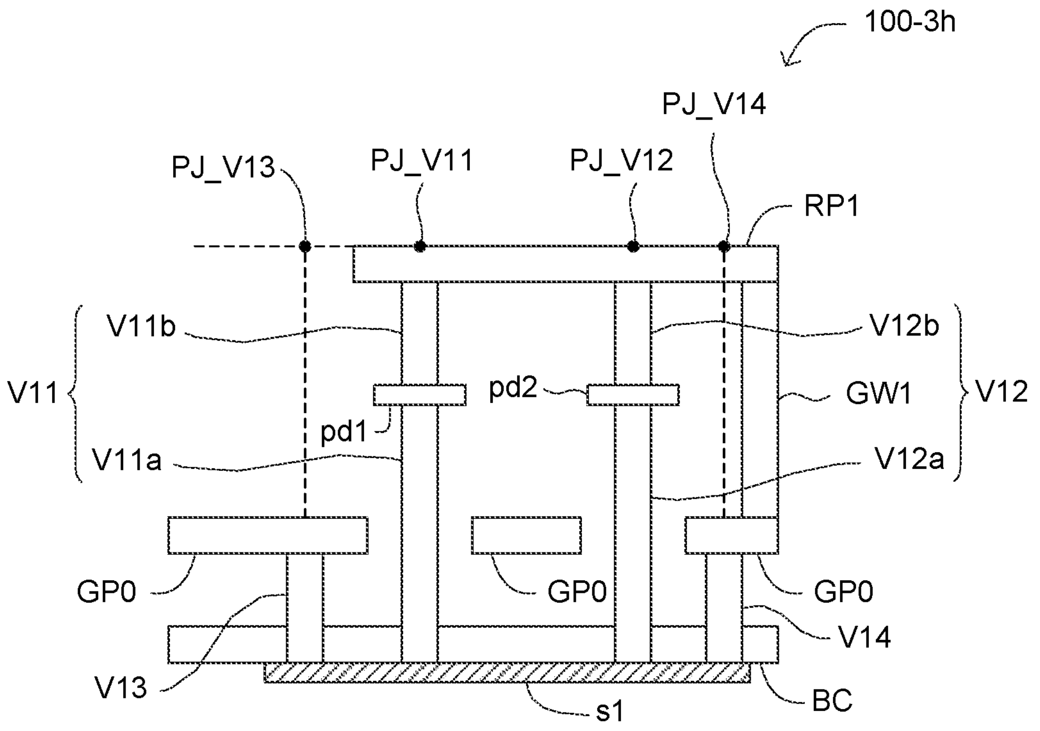

Next, referring to FIG. 5H, the resonating unit 100-3*h* is similar to the resonating unit 100-3*g* of FIG. 5G except that, the resonating unit 100-3*h* further includes two connecting elements, i.e., a via V13 and a via V14. Unlike the vias V11 and V12 which are arranged between the radiating plate RP1 and the bottom circuit board BC, on the other hand, at least one of the vias V13 and V14 are arranged between the ground plane GP0 and the bottom circuit board BC. Furthermore, the vias V13 and V14 may not be connected with any pads, in contrast, the via V11 is connected with the pad pd1, and the via V12 is connected with the pad pd2.

More particularly, the vias V11, V12, V13 and V14 are substantially parallel with one another, but the vias V11, V12, V13 and V14 may not be aligned with one another at the same vertical line along the direction D3. More particularly, the vias V11, V12, V13 and V14 have respective projections PJ_V11, PJ_V12, PJ_V13 and PJ_V14. For the vias V11, V12 and V14, their projections PJ_V11, PJ_V12 and PJ_V14 are projected on the radiating plate RP1. On the other hand, for the via V13, its projection PJ_V13 is projected on a predefined reference plane which the radiating plate RP1 extends along. The projections PJ_V11, PJ_V12, PJ_V13 and PJ_V14 may not overlap one another.

In the example of FIG. 5H, the vias V11, V12 and V14 are arranged under the radiating plate RP1, such that the projections PJ_V11, PJ_V12 and PJ_V14 may fall within the boundaries B1, B2 and B3 of the radiating plate RP1 (the boundaries B1, B2 and B3 of the radiating plate RP1 are shown in FIGS. 2A and 2B). On the other hand, the projection PJ_V13 of the via V13 may be located outside the boundaries B1, B2 and B3 of the radiating plate RP1.

In operation, the switch s1 serves to selectively connect the vias V11, V12, V13 and V14 with one another. Depending on a routing scheme of the switch s1, one of the vias V11-V14 may be connected with other one or more of the vias V11-V14. Such as, the via V13 may be connected with the neighboring via V11. In another example, the via V13 may be connected with two vias V11 and V12.

In other examples of FIGS. 5G and 5H, the switch s1 of the resonating unit 100-3*g* and 100-3*h* may be replaced by a diode, a filter or an impedance tuner (not shown in FIGS. 5G and 5H).

Figure 6A:
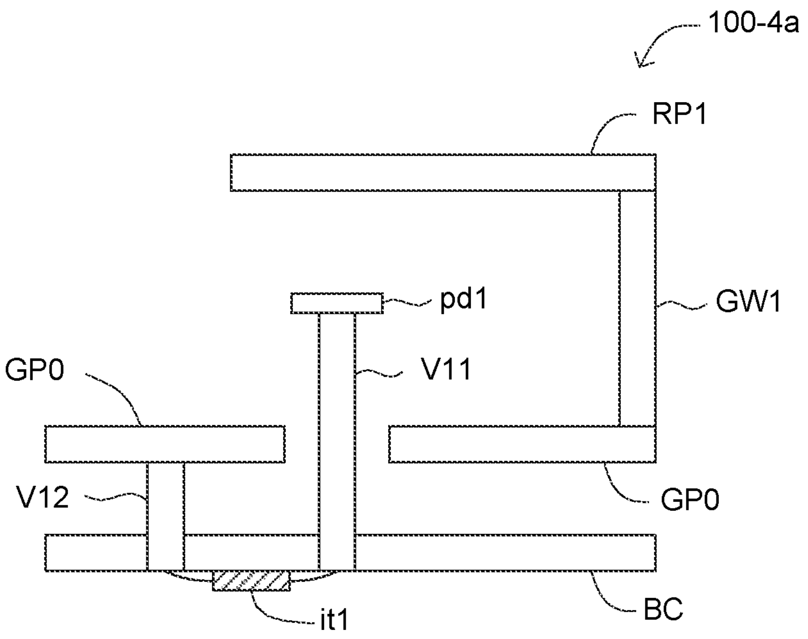
FIGS. 6A and 6B are schematic diagrams illustrating cross-sectional views of the resonating units according to yet other examples of the present disclosure.
Figure 6B:
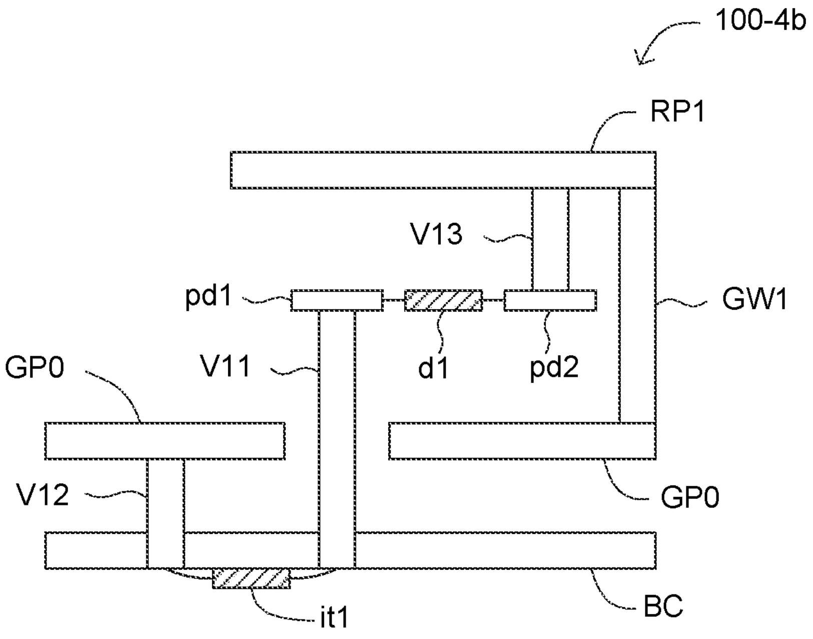

FIGS. 6A and 6B are schematic diagrams illustrating cross-sectional views of the resonating units 100-4*a* and 100-4*b* according to yet other examples of the present disclosure. First, referring to FIG. 6A, the resonating unit 100-4*a* is similar to the resonating unit 100-3*g* of FIG. 5G except that, the control element of the resonating unit 100-4*a* is an impedance tuner it1, which replaces the switch s1 of FIG. 5G. Furthermore, the via V12 of the resonating unit 100-4*a* is arranged between the ground plane GP0 and the bottom circuit board BC, and the via V12 may not penetrating the ground plane GP0. Moreover, the via V11 is electromagnetically coupled to the radiating plate RP1 through the pad pd1, but via V11 may not directly contact the ground wall GW1 and the radiating plate RP1. In operation, the impedance tuner it1 serves to adjust impedance of a conductive path formed by the via V11 and the via V12, and the antenna 1000 may achieve different values of antenna gain according to different values of adjusted impedance.

In other examples, the control element of the resonating unit 100-4*a* may be a diode, a filter or a switch (not shown in FIG. 6A).

Next, referring to FIG. 6B, the resonating unit 100-4*b* is similar to the resonating unit 100-4*a* of FIG. 6A except that, the resonating unit 100-4*b* further includes another connecting element (i.e., the via V13) and another control element (i.e., the diode d1). The via V13 is connected with the via V11 through the pad pd2, the diode d1 and the pad pd1.

Therefore, the radiating plate RP1 may be conductively connected with the bottom circuit board BC through the vias V13 and V11, depending on the status of the diode d1.

In other examples, the impedance tuner it1 of the resonating unit 100-4*b* may be replaced by a diode, a filter or a switch. Furthermore, the diode d1 of the resonating unit 100-4*b* may be replaced by a filter, a switch or an impedance tuner (not shown in FIG. 6B).

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An antenna device with a tunable gain, comprising:
- a ground plane; and
- a plurality of resonating units, wherein a first resonating unit of the resonating units comprising:
  - a radiating plate, arranged above the ground plane, and substantially parallel with the ground plane;
  - a ground wall, arranged between the radiating plate and the ground plane, and substantially perpendicular to the ground plane; and
  - a first connecting element, extending along a predefined direction substantially perpendicular to the ground plane,
  - wherein the first connecting element is adapted to couple the radiating plate to the ground plane.

2. The antenna device according to claim 1, wherein the radiating plate extends along a predefined plane, and the first connecting element has a first projection taken along the predefined direction and projected on the predefined plane, the first projection is located within a plurality of boundaries of the radiating plate.

3. The antenna device according to claim 1, wherein the first connecting element directly contacts one or both of the radiating plate and the ground plane.

4. The antenna device according to claim 1, wherein the first connecting element is electromagnetically coupled to one or both of the radiating plate and the ground plane.

5. The antenna device according to claim 1, wherein the first connecting element is arranged between the radiating plate and the ground plane.

6. The antenna device according to claim 1, wherein a portion of the first connecting element is arranged above the radiating plate.

7. The antenna device according to claim 1, wherein the first connecting element is connected with a first pad, and the first connecting element is electromagnetically coupled to the radiating plate or the ground plane through the first pad.

8. The antenna device according to claim 7, wherein the first resonating unit further comprising:
- a first trace, substantially parallel with the ground plane,
- wherein the first connecting element is coupled to the ground wall through the first trace.

9. The antenna device according to claim 8, wherein the first connecting element is coupled to the first trace through the first pad.

10. The antenna device according to claim 8, wherein the first connecting element is coupled to the first trace through a first control element, the first control element is a filter, a diode, a switch or an impedance tuner.

11. The antenna device according to claim 8, wherein the first connecting element is coupled to the ground wall through a second trace, and the second trace is substantially parallel with the first trace.

12. An antenna device with a tunable gain, comprising:
- a ground plane; and
- a plurality of resonating units, wherein a first resonating unit of the resonating units comprising:
  - a radiating plate, arranged above the ground plane, and substantially parallel with the ground plane;
  - a ground wall, arranged between the radiating plate and the ground plane, and substantially perpendicular to the ground plane;
  - a first connecting element, extending along a predefined direction substantially perpendicular to the ground plane; and
  - a second connecting element, substantially parallel with the first connecting element,
  - wherein the first connecting element and the second connecting element are adapted to couple the radiating plate to the ground plane, and, at least one of the first connecting element and the second connecting element has a projection located within a plurality of boundaries of the radiating plate.

13. The antenna device according to claim 12, wherein the first connecting element is coupled to the second connecting element through a first trace or a first control element, the first control element is a filter, a diode, a switch or an impedance tuner.

14. The antenna device according to claim 13, wherein the first connecting element is connected with a first pad, and the second connecting element is connected with a second pad, the first control element is connected with the first pad and the second pad.

15. The antenna device according to claim 14, wherein the first connecting element has two portions coupled to each other through the first pad, and the second connecting element has two portions coupled to each other through the second pad.

16. The antenna device according to claim 13, wherein the first control element is arranged on an upper surface of the radiating plate.

17. The antenna device according to claim 13, wherein the first resonating unit further comprising:
- a second control element, adapted to couple the first connecting element to the second connecting element, or couple the first connecting element to the ground wall,
- wherein the second control element is a filter, a diode, a switch or an impedance tuner.

18. The antenna device according to claim 13, further comprising:
- a bottom circuit board, arranged under the ground plane,
- wherein at least one of the first connecting element and the second connecting element are adapted to penetrate the ground plane and coupled to the bottom circuit board.

19. The antenna device according to claim 18, wherein the first resonating unit further comprising:
- a third connecting element, substantially parallel with the first connecting element and the second connecting element,
- wherein the third connecting element is arranged between the radiating plate and the ground plane or arranged between the ground plane and the bottom circuit board.

20. The antenna device according to claim 18, wherein the first control element is arranged on a lower surface of the bottom circuit board.

* * * * *